April 5, 1932.    L. R. EASTMAN    1,852,705
MOLD AND UNLOADING DEVICE FOR SAME
Filed Aug. 19, 1929    5 Sheets-Sheet 4

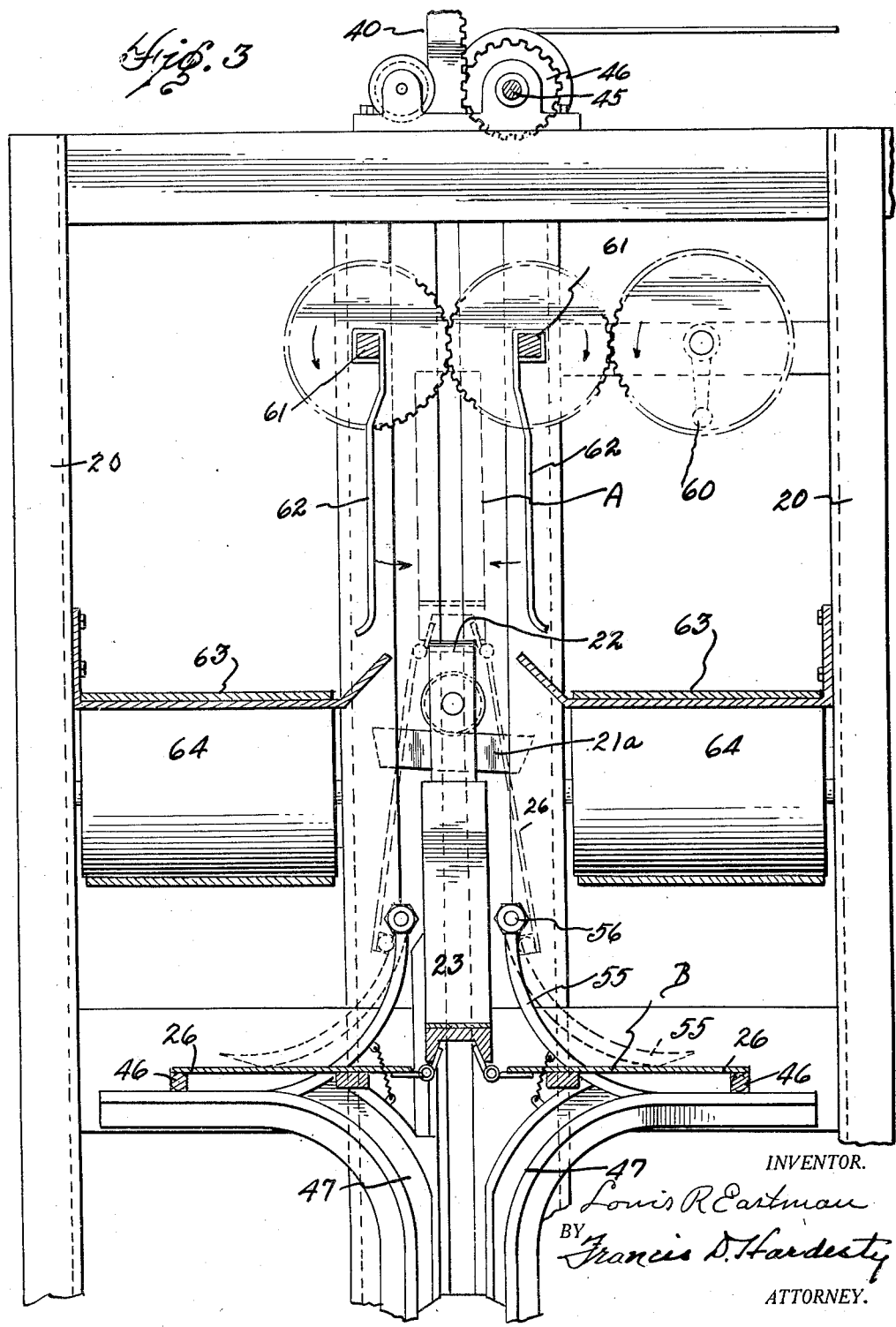

INVENTOR.
Louis R Eastman
BY Francis D. Hardesty
ATTORNEY.

April 5, 1932. L. R. EASTMAN 1,852,705
MOLD AND UNLOADING DEVICE FOR SAME
Filed Aug. 19, 1929  5 Sheets-Sheet 5
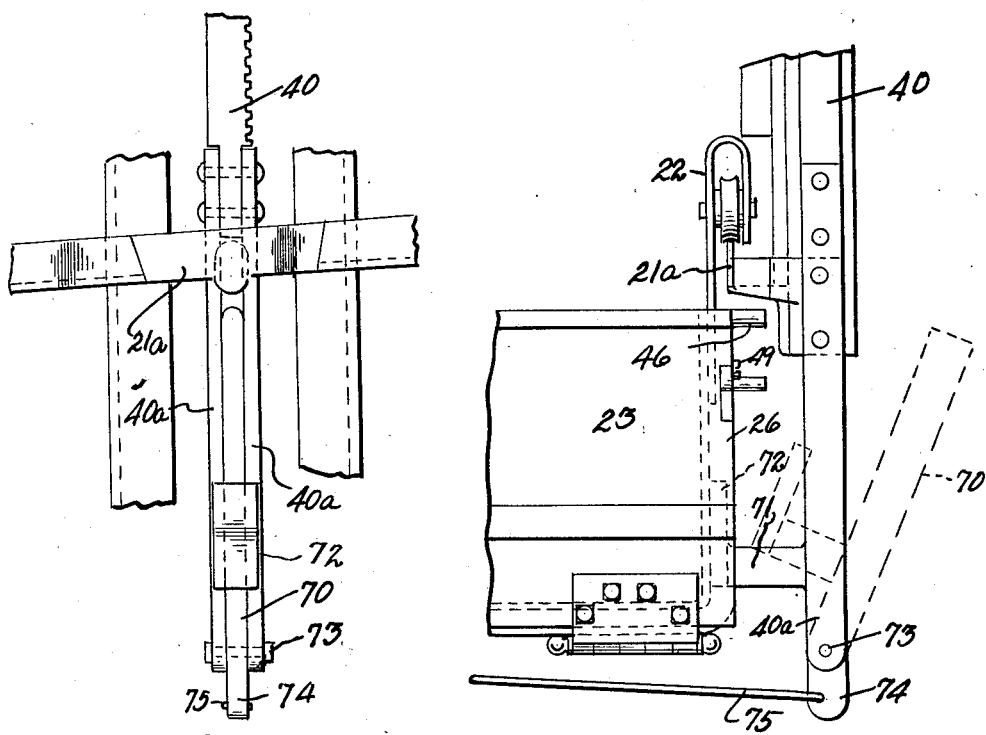
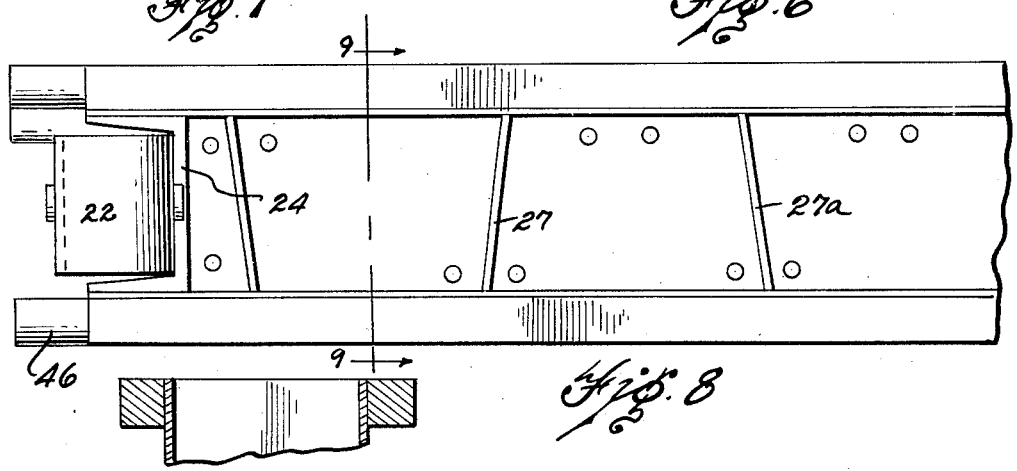
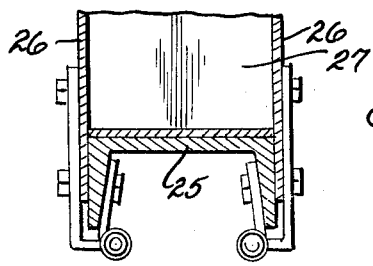
INVENTOR:
Louis R Eastman
BY
Francis D Hardesty
ATTORNEY.

Patented Apr. 5, 1932

1,852,705

UNITED STATES PATENT OFFICE

LOUIS R. EASTMAN, OF DETROIT, MICHIGAN, ASSIGNOR TO FREDERIC B. STEVENS, INC., OF DETROIT, MICHIGAN, A CORPORATION OF MICHIGAN

MOLD AND UNLOADING DEVICE FOR SAME

Application filed August 19, 1929. Serial No. 386,765.

The present invention relates to molds for compositions of matter and to unloading devices for the same.

In the manufacture of many compositions of matter, it is common to prepare them by conducting the compounding of the constituents at a temperature at which some or all are fusible and to pour such compositions in suitable molds to cool and form cakes. With the usual type of mold the removal of the cakes therefrom is somewhat difficult and laborious.

Among the objects of the present invention is to overcome such objections and greatly decrease the labor thereof and to provide a mold and unloading mechanism that will quickly and efficiently remove such cakes with a minimum of labor.

Other objects will readily occur to those skilled in the art upon reference to the following description and the accompanying drawings in which Figure 1 is a side elevation of the unloading machine with a mold thereon.

Figure 3 is an enlarged partly sectional view of the mechanism for elevating and opening the mold.

Figures 6 and 7 are respectively side and end elevations of the mechanism for preventing the swinging of the mold.

Figures 8 and 9 are respectively a plan view of a mold and a section on line 9—9 of Figure 8.

Figure 1:
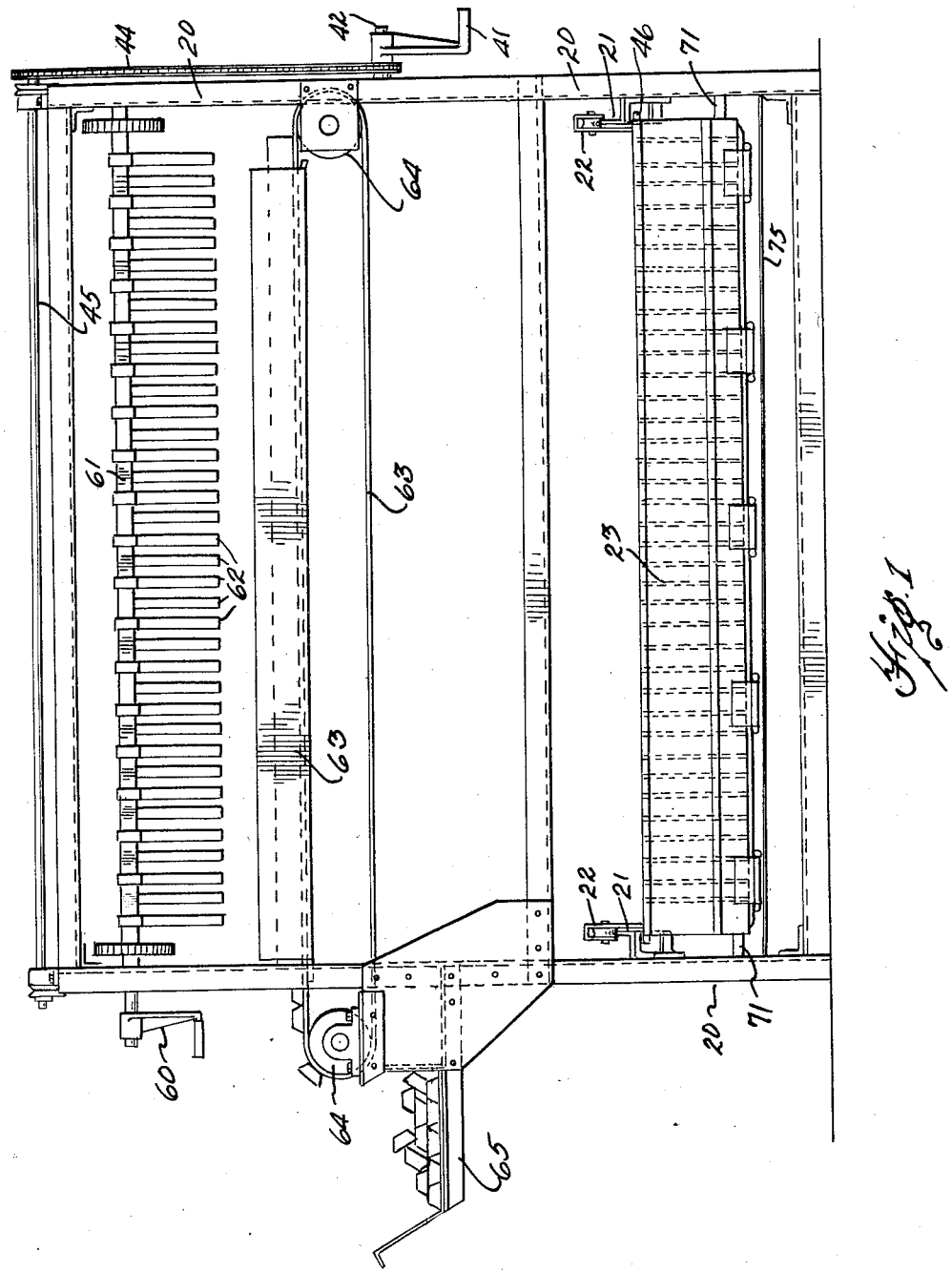
Figure 2:
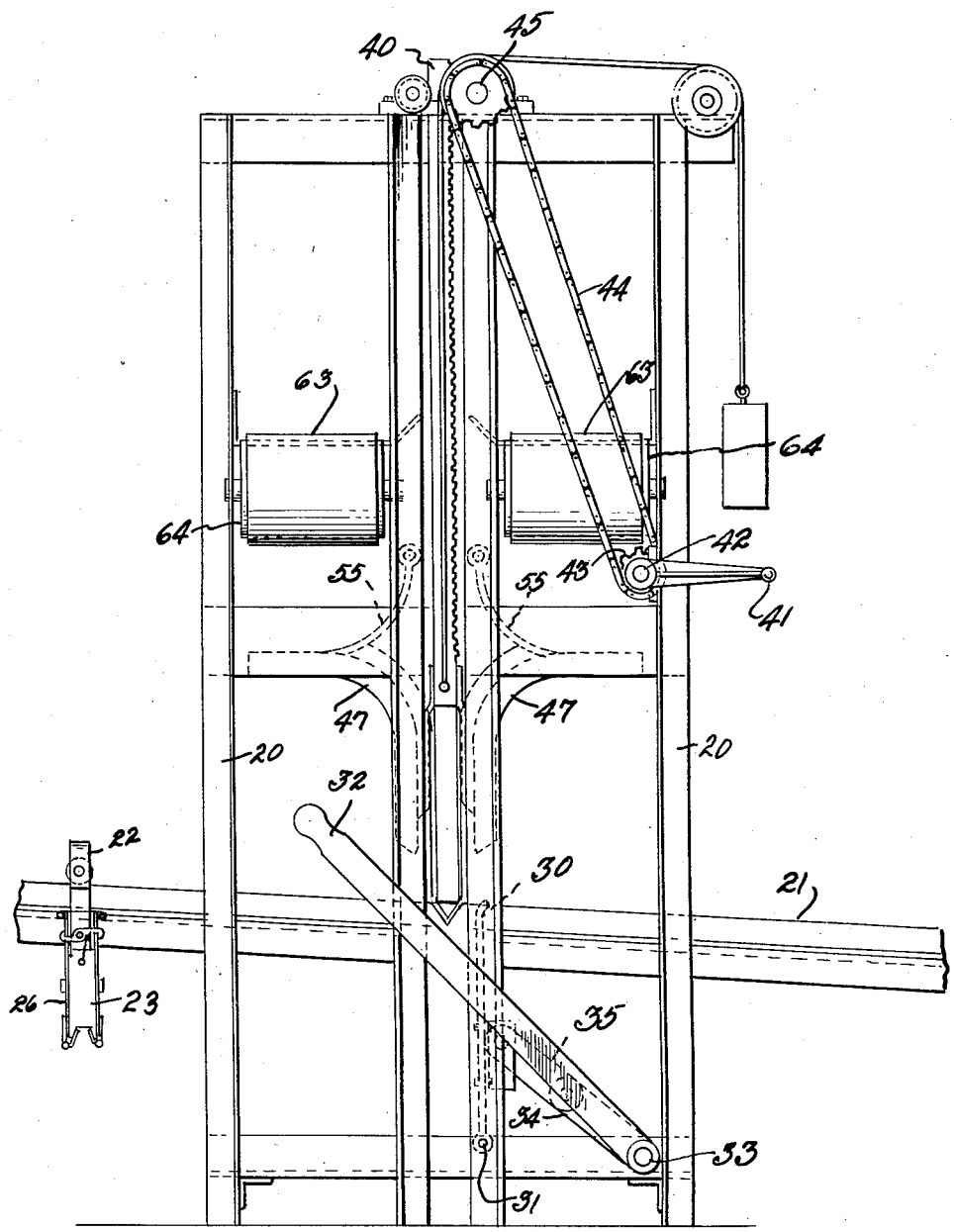
Figure 2 is an end elevation of the same.
Figure 5:
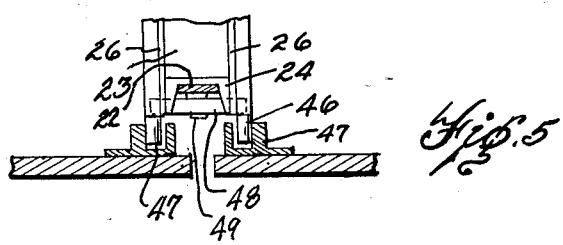
Figure 5 is a section on line 5—5 of Figure 4.
Figure 4:
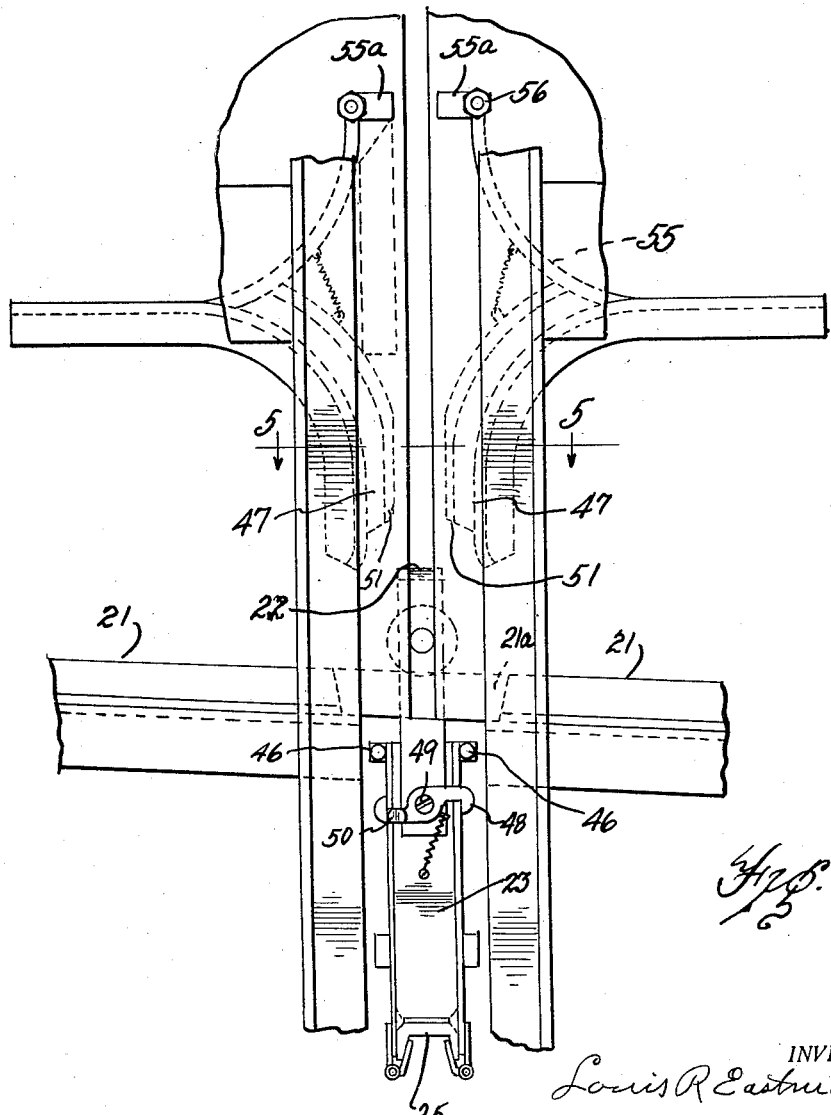
Figure 4 is a similar view of part of the mechanism of Figure 3 showing a mold in end view and closed.

In the drawings, the machine is shown as comprising a frame work 20 carrying near its lower end tracks 21 for the roller hangers 22 of the molds, one of which is indicated at 23. These molds consist of the end pieces 24, preferably channel members, to which are riveted the hangers 23 and which are integral with a bottom member 25. In forming the mold, a single piece of channel will be bent near its ends into U-shape and this forms the frame of the mold. The sides 26 of the mold are hinged to the bottom portion, as indicated best in Figures 1 and 9 and the mold will be divided by sheet metal partition members 27 which are so arranged that each alternate partition member 27 is set at an angle to the intervening partition members 27a so that the mold is divided into a number of trapezoidal shaped chambers open at both sides when the sides 26 are let down.

The molds 23 are filled with the material at some suitable point, rolled down upon the tracks 21 and stopped at any suitable point before entering the frame 20.

When it is desired to unload one of the molds, it is allowed to travel further down the track 21 until it reaches a movable stop member 30. This stop member is hinged to the frame as at 31 and may be moved out of the path of the mold by means of a lever 32 hinged at 33 and connected to the stop member. The connection comprises a crank arm 34 fixed to the shaft 33 to which lever 32 is keyed and which arm is connected to the stop member 30 through a link 35 so that when the lever 32 is moved clockwise, it pulls the stop member 30 out of the way of the mold and allows the latter to continue on down the track.

Mounted at each end in the frame 20 above the track 21 is a vertically arranged rack 40 to which, at its lower end, is connected a short section 21a of the track 21 which is disconnected from the balance of the track and is movable with the rack 40. This rack is moved vertically through the operation of a crank 41 mounted on a shaft 42 carrying a sprocket wheel 43. The sprocket wheel 43 drives a chain 44 which in turn drives a shaft 45 carrying the gears 46 over at each end of the machine adapted to actuate the two racks 40. When the racks are lifted vertically, they carry with them the track section 21a upon which is resting one of the molds 23. This elevates the mold and after it has moved a short distance the pins 46, with which each side is provided at its ends, enter guide ways 47 mounted on the frame work a short distance above the track level.

Each mold at its ends is provided with a double ended catch member 48 mounted rotatably as at 49 on the end pieces 24. This catch member 48 holds the sides of the mold closed, but is provided with a projection 50 which strikes the lower end 51 of one of the guide ways 47 and thus releases the two sides of the mold. Upon further elevation of the mold by means of the rack, the ends travel in the guide ways 47 and the latter being diverging, cause the sides of the mold to flatten out until the mold reaches the condition indicated in Figure 3.

The rack is then further elevated lifting the mold until it reaches the position A, indicated in Figure 3, and in position to be unloaded. In the meantime, the sides 26 have been dropped down and are prevented from reaching a vertical position by the curved guide members 55, which being pivoted at 56, allow the pins 46 to pass under them as the sides 26 are moved to the position B of Figure 3, but immediately drop behind the pins, as indicated in this figure, the dotted line position of guides 55 indicating the position when the pins are passing thereunder.

When the mold has reached the position A of Figure 3, the crank handle 60 (Fig. 1) is rocked and this causes the rocking of two shafts 61 geared to each other and to the shaft on which the crank handle 60 is mounted, so as to move the fingers 62 on shafts 61 toward each other.

These fingers 62 are so arranged that they strike the cakes of material in the mold on the narrow side and force them outwardly, wherein they drop upon belt conveyors 63 mounted on rollers 64 carried by the frame. The material is then carried by the conveyors to one end of the machine and dropped upon a platform 65 from which it may be removed and disposed of.

After the material has been removed from the mold, the crank 41 is rotated in a reverse direction to lower the rack 40 and the mold is lowered therewith.

On the downward motion, the sides 26 move from position A to position B and at the same time, of course, the mold body moves to the full line position of Figure 3. The further downward movement of the mold, of course, causes the pins 46 of the mold to move inwardly again and when the latter are about to strike the ends of the guides 55, these are lifted by the striking of the projections 55a by the catch member 48 so as to allow the pins to pass under the guides 55 and into guides 47.

As the pins pass out of the lower ends of the guides 47, the sides 26 are by this time completely closed and the catch member 48 holds them in this condition. When the track section 21a has finally reached its alignment with the rest of the track 21, the operation has been completed. Thereupon the stop member 30 is moved and the mold is allowed to travel further down the track.

In order to prevent the mold swinging when the elevating begins, it is preferred to continue the racks 40 below the track section 21a in the two members 40a, which at the top are spread apart by the lower end of the rack and to mount between them a lever 70 which is provided with a lateral extension 71 having a foot 72 which is adapted to pass between the extended edges of the sides 26 of the mold and prevent any lateral sway thereof. This lever 70 is pivoted at its lower end as at 73 between the two members 40a and is provided with an extension 74 which has a link 75 connected to a similar lever at the other end of the lever 70, preferably above the pivot point of the latter.

When, therefore, the lever 70 is moved to the dotted line postion of Figure 6, the lever on the opposite end is also moved out and a mold 23 may be put in position to be operated on. The lever 70 is then moved back into its vertical position and passes up with the mold and rack.

It will be noted that the mold described above provides for the individual molds to be arranged in the gang mold on end and with a very narrow dividing element between them. This arrangement provides for only a very small amount of waste of the material in passing from one mold to the next. In the ordinary flat gang mold the divisions between the molds are usually of greater width than the partitions 27 and 27a and on account of the length of the mold there is apt to be considerable material lying on the top of the dividing element when the mold has been filled. These connecting pieces of the molded material form fins which are easily broken off and are so much waste material.

Further, by arranging the molds facing alternately to one side and then the other, a saving in space may be accomplished over any arrangement of them all facing the same side. And by hinging the sides of the gang mold so that the entire face of the mold is open, it is also possible to provide for embossing either the top or the bottom of the cake.

Now, having described the invention and the preferred forms of embodiment thereof, it is to be understood that the said invention is to be limited not to the specific details herein set forth and illustrated, but only by the scope of the claims which follow:

I claim:—

1. An unloading machine for molds having their sides hinged, comprising means for elevating said molds from a lower to a higher position, means operative during said elevation to release and open said sides, means to eject the contents from said mold while in open condition and means to close said sides when said molds are being lowered to their original position.

2. In combination, a mold having hinged sides, and an unloader therefor comprising means to release said sides, means to remove the mold contents, and means to return the sides to closed position.

3. In combination, a mold having hinged sides, with longitudinally extending pins on said sides, and an unloader therefor comprising means to release said sides, guides for said pins arranged to move positively said sides to open position, means to remove the mold contents, and means to return the sides to closed position.

4. In combination, a mold having hinged sides, and an unloader therefor comprising means for transferring said molds from a transporting position to an unloading position, means to release said sides, means to remove the mold contents, and means to return the sides to closed position.

5. In combination, a mold having hinged sides, with longitudinally extending pins on said sides, and an unloader therefor comprising means for transferring said molds from a transporting position to an unloading position, means to release said sides, guides for said pins arranged to move positively said sides to open position, means to remove the mold contents, and means to return the sides to closed position.

6. In combination, a mold having hinged sides, with longitudinally extending pins on said sides, and an unloader therefor comprising means to elevate said molds to an unloading position, outwardly diverging guideways for said pins for moving said sides to open position during such elevation, means for removing the mold contents while in elevated position, means for lowering said molds, said guides acting to close said sides during said lowering, and means for conveying to a point of discharge the unloaded mold contents.

7. In combination, a mold having hinged sides, with longitudinally extending pins on said sides, and an unloader therefor comprising means to elevate said molds to an unloading position, means to prevent lateral movement of said molds, outwardly diverging guideways for said pins for moving said sides to open position during such elevation, means for removing the mold contents while in elevated position, means for lowering said molds, said guides acting to close said sides during said lowering, and means for conveying to a point of discharge the unloaded mold contents.

8. In a machine of the class described, a gang mold comprising a horizontally disposed smooth surfaced bottom member upon which articles of manufacture may be disposed, transverse partition members extending from side to side and projecting upwardly from said bottom member, these forming the only stationary parts projecting upwardly from said bottom member, and a pair of side walls or wings pivotally connected to the bottom member on opposite side edges of the latter, the pivotal mounting being such as to enable the side walls to be moved upwardly to vertical position, whereby they may form a closed gang mold, or to be moved downwardly, to or below horizontal position to leave the bottom member free to be engaged by members movable towards the mold from the sides thereof and free of obstructions which would prevent the molded articles from being swept off the mold, laterally, each of said side walls having means on its end edges whereby the side walls may be guided in their movement by cooperating parts of the machine, said means comprising pins adapted to ride in slots in the machine frame.

LOUIS R. EASTMAN.